United States Patent
Ohwada et al.

(10) Patent No.: US 10,581,114 B2
(45) Date of Patent: Mar. 3, 2020

(54) BATTERY-EQUIPPED DEVICE

(71) Applicant: NGK INSULATORS, LTD., Nagoya-Shi (JP)

(72) Inventors: Iwao Ohwada, Nagoya (JP); Toshihiro Yoshida, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 213 days.

(21) Appl. No.: 15/497,582

(22) Filed: Apr. 26, 2017

(65) Prior Publication Data

US 2017/0229733 A1    Aug. 10, 2017

Related U.S. Application Data

(63) Continuation of application No. PCT/JP2015/068416, filed on Jun. 25, 2015.

(30) Foreign Application Priority Data

Dec. 9, 2014 (JP) .................. 2014-249371

(51) Int. Cl.
*H01M 10/0562* (2010.01)
*H01M 4/505* (2010.01)
(Continued)

(52) U.S. Cl.
CPC ..... *H01M 10/0562* (2013.01); *H01M 2/1066* (2013.01); *H01M 4/382* (2013.01);
(Continued)

(58) Field of Classification Search
CPC .................. H01M 2002/0205; H01M 10/0562
See application file for complete search history.

(56) References Cited

U.S. PATENT DOCUMENTS

8,431,264 B2    4/2013  Neudecker et al.
2004/0131897 A1*  7/2004  Jenson ................ H01M 2/0267
                                                            429/7
(Continued)

FOREIGN PATENT DOCUMENTS

CN    1757086 A    4/2006
JP    2000-195482 A    7/2000
(Continued)

OTHER PUBLICATIONS

Machine translation of Jp2012064487a printed Mar. 28, 2019 (Year: 2019).*

(Continued)

*Primary Examiner* — Maria Laios
(74) *Attorney, Agent, or Firm* — Burr & Brown, PLLC

(57) ABSTRACT

Provided is a battery-equipped device including a substrate, a device disposed on the substrate, an all-solid-state battery disposed such that the planar shape conforms to the periphery of the device on the substrate and at least partially having a complementary outer edge shape that conforms to the entire or a part of the outer edge shape of the device, and interconnections connecting the device and the all-solid-state battery. The all-solid-state battery includes a positive electrode layer containing an oriented polycrystalline positive-electrode active material composed of lithium transition metal oxide particles oriented in a certain direction, a solid electrolyte layer composed of a lithium-ion conductive material, and a negative electrode layer containing a negative-electrode active material. The present invention can provide a battery-equipped device that can significantly increase the degree of freedom of design and can output necessary electric power in a minimum space.

17 Claims, 4 Drawing Sheets

(51) Int. Cl.
*H01M 4/525* (2010.01)
*H01M 10/0585* (2010.01)
*H01M 10/052* (2010.01)
*H01M 2/10* (2006.01)
*H01M 4/38* (2006.01)
*H01M 10/0525* (2010.01)

(52) U.S. Cl.
CPC ........... *H01M 4/505* (2013.01); *H01M 4/525* (2013.01); *H01M 10/052* (2013.01); *H01M 10/0525* (2013.01); *H01M 10/0585* (2013.01); *H01M 2220/30* (2013.01); *H01M 2300/0068* (2013.01); *H01M 2300/0071* (2013.01)

(56) References Cited

U.S. PATENT DOCUMENTS

| | | |
|---|---|---|
| 2010/0159326 A1 | 6/2010 | Sugiura et al. |
| 2011/0053000 A1 | 3/2011 | Kanamura et al. |
| 2011/0053002 A1 | 3/2011 | Yamamura et al. |
| 2011/0162972 A1* | 7/2011 | Furuya ............... H01M 4/1391 205/223 |
| 2012/0009470 A1 | 1/2012 | Sugiura et al. |
| 2012/0009471 A1 | 1/2012 | Sugiura et al. |
| 2013/0043731 A1 | 2/2013 | Mullin |
| 2014/0377665 A1 | 12/2014 | Yoshida et al. |
| 2015/0037664 A1* | 2/2015 | Kang ................. H01M 2/0287 429/179 |

FOREIGN PATENT DOCUMENTS

| | | | | |
|---|---|---|---|---|
| JP | 2000-285881 A1 | 10/2000 | | |
| JP | 2006-515952 A | 6/2006 | | |
| JP | 2009-516359 A | 4/2009 | | |
| JP | 2010-027301 A | 2/2010 | | |
| JP | 2011-051800 A | 3/2011 | | |
| JP | 2011-073962 A | 4/2011 | | |
| JP | 2011-073963 A | 4/2011 | | |
| JP | 4745463 B2 | 8/2011 | | |
| JP | 2012-009193 A | 1/2012 | | |
| JP | 2012-009194 A | 1/2012 | | |
| JP | 2012-064487 | * 3/2012 | ........ H01M 10/0585 |
| JP | 2012-064487 A | 3/2012 | | |
| JP | 2014-529848 A | 11/2014 | | |
| WO | 2004/061887 A1 | 7/2004 | | |
| WO | 2007/061928 A2 | 5/2007 | | |
| WO | WO-2013168948 A1 | * 11/2013 | .......... H01M 2/0287 |

OTHER PUBLICATIONS

International Search Report and Written Opinion (with English Translation), International Application No. PCT/JP2015/068416, dated Sep. 29, 2015 (20 pages).

Japanese Office Action (Application No. 2016-563540) dated Dec. 27, 2018 (with English translation).

Chinese Office Action (with English translation), Chinese Application No. 201580058425.0, dated Jun. 19, 2019 (17 pages).

* cited by examiner

BATTERY-EQUIPPED DEVICE

CROSS-REFERENCE TO RELATED APPLICATIONS

This application is a continuation application of PCT/JP2015/068416 filed Jun. 25, 2015, which claims priority to Japanese Patent Application No. 2014-249371 filed Dec. 9, 2014, the entire contents all of which are incorporated herein by reference.

BACKGROUND OF THE INVENTION

1. Field of the Invention

The present invention relates to a battery-equipped device.

2. Description of the Related Art

The recent development of portable devices, such as personal computers and cellular phones, has been greatly expanding the demand for batteries as the power sources of the devices. Traditional batteries for such application contain liquid electrolytes (electrolytic solutions) containing flammable organic diluent solvents, as media for ion transfer. The battery containing such an electrolytic solution has a risk of the leakage of the electrolytic solution, ignition, explosion, or the like.

To solve the problems, an all-solid-state battery has been developed that contains a solid electrolyte instead of a liquid electrolyte and consists of only solid components for ensuring the intrinsic safety. The all-solid-state battery, which contains a solid electrolyte, has a low risk of ignition, causes no liquid leakage, and barely causes a decline in the battery performance due to corrosion.

The recent expansion of the application of batteries has been demanding smaller batteries with larger capacity. For example, such batteries include an all-solid-state battery that has a thick positive electrode and increased capacity. Patent Document 1 (U.S. Pat. No. 8,431,264) and Patent Document 2 (JP2009-516359A) each disclose an all-solid-state battery including a positive electrode having a thickness of more than approximately 4 μm and less than approximately 200 μm, a solid electrolyte having a thickness of less than approximately 10 μm, and a negative electrode having a thickness of less than approximately 30 μm. The positive electrodes disclosed in these documents apparently are composed of non-oriented positive-electrode active materials.

An oriented sintered plate made of lithium complex oxide has been proposed. For example, Patent Document 3 (JP2012-009193A) and Patent Document 4 (JP2012-009194A) each disclose a lithium-complex-oxide sintered plate having a layered rock-salt structure and having a diffraction intensity ratio [003]/[104] of 2 or less of the (003) plane to of the (104) plane in X-ray diffraction. Patent Document 5 (JP4745463B) discloses platy particles that are expressed by the general formula: $Li_p(Ni_x,Co_y,Al_z)O_2$ (where $0.9 \leq p \leq 1.3$, $0.6 < x \leq 0.9$, $0.1 < y \leq 0.3$, $0 \leq z \leq 0.2$, and $x+y+z=1$), that have a layered rock-salt structure, and in which the (003) plane is oriented so as to intersect the plate surface of the particle.

A garnet-type ceramic material having a $Li_7La_3Zr_2O_{12}$-based (LLZ-based) composition has received attention as a solid electrolyte having lithium-ion conductivity. For example, according to Patent Document 6 (JP2011-051800 Å), addition of Al to Li, La, and Zr, which are the basic elements of LLZ, improves denseness and lithium-ion conductivity. According to Patent Document 7 (JP2011-073962A), addition of Nb and/or Ta to Li, La, and Zr, which are the basic elements of LLZ, further improves lithium-ion conductivity. Patent Document 8 (JP2011-073963A) discloses that a composition containing Li, La, Zr, and Al in a molar ratio of Li to La of 2.0 to 2.5 further improves denseness.

CITATION LIST

Patent Documents

[Patent Document 1] U.S. Pat. No. 8,431,264
[Patent Document 2] JP2009-516359A
[Patent Document 3] JP2012-009193A
[Patent Document 4] JP2012-009194A
[Patent Document 5] JP4745463B
[Patent Document 6] JP2011-051800A
[Patent Document 7] JP2011-073962A
[Patent Document 8] JP2011-073963A

SUMMARY OF THE INVENTION

All-solid-state batteries including non-oriented positive-electrode active materials as shown in Patent Documents 1 and 2 have a problem in that the expected increases in the capacity and energy density are not obtained even if a thick positive electrode layer is formed. The applicant is accordingly working on the development of all-solid-state batteries including oriented positive electrode plates. Since the oriented positive electrode plates are each made of an oriented polycrystalline material composed of lithium transition metal oxide particles oriented in a certain direction, highly-efficient intercalation and deintercalation of lithium ions readily occur over the entire thickness of the positive electrode layer and the capacity improvement effect due to the thick positive-electrode active material can be maximized even if a thick layer of a positive-electrode active material is disposed. For example, lithium present at the side away from the solid electrolyte also can be sufficiently used for charge and discharge in the thick positive electrode layer. The improved capacity in such a manner significantly increases the energy density of the all-solid-state battery. That is, the all-solid-state battery exhibits excellent battery characteristics, such as a large capacity and a high energy density. Thus, the all-solid-state battery can have large capacity, high energy density, and high-level safety, even if it is relatively thin or compact. That is, an all-solid-state battery including a thick oriented positive electrode plate has an advantage of capable of increasing the capacity and energy density of the battery.

The present inventors have found that such an all-solid-state battery is not only relatively thin or compact but also is mainly made of a ceramic material that can be formed into a desired outer edge shape (in particular, an irregular shape including a polygonal shape or an arc) in a plane direction (i.e., the direction perpendicular to the thickness). The inventors have then found that an all-solid-state battery having a desired outer edge shape provided such that the planar shape conforms to the periphery of a device on a substrate having a limited space can significantly increase the degree of freedom of design of the device and can output necessary electric power in a minimum space even if the device is required to be reduced in size and to save space, such as a wearable device.

Accordingly, an object of the present invention is to provide a battery-equipped device that can significantly increase the degree of freedom of design and can output necessary electric power in a minimum space.

An embodiment of the present invention provides a battery-equipped device comprising:
a substrate;
a device disposed on the substrate;
an all-solid-state battery disposed such that the planar shape conforms to the periphery of the device on the substrate and at least partially having a complementary outer edge shape that conforms to the entire or a part of the outer edge shape of the device; and
interconnections connecting the device and the all-solid-state battery, wherein
the all-solid-state battery includes a positive electrode layer containing a positive-electrode active material that is an oriented polycrystalline body composed of lithium transition metal oxide particles oriented in a certain direction; a solid electrolyte layer composed of a lithium-ion conductive material; and a negative electrode layer containing a negative-electrode active material.

DETAILED DESCRIPTION OF THE INVENTION

Battery-Equipped Device

The present invention relates to a battery-equipped device. The battery-equipped device can be any device requiring electric power and can be, for example, a display. The battery-equipped device of the present invention includes a substrate, a device disposed on the substrate, an all-solid-state battery disposed in the periphery of the device on the substrate, and interconnections connecting the device and the all-solid-state battery. The all-solid-state battery includes a positive electrode layer containing a positive-electrode active material that is an oriented polycrystalline body composed of lithium transition metal oxide particles oriented in a certain direction; a solid electrolyte layer composed of a lithium-ion conductive material; and a negative electrode layer containing a negative-electrode active material. The all-solid-state battery is disposed such that the planar shape conforms to the periphery of the device on the substrate and at least partially has a complementary outer edge shape that conforms to the entire or a part of the outer edge shape of the device.

Figure 1:
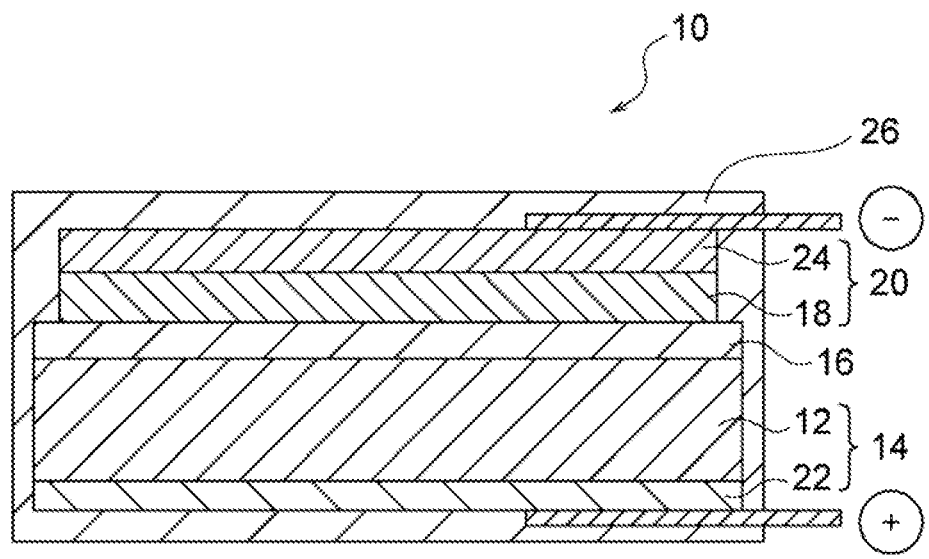
FIG. 1 is a cross-sectional view schematically illustrating an example all-solid-state battery used in a battery-equipped device of the present invention.

FIG. 1 schematically illustrates an example all-solid-state battery used in the present invention. The all-solid-state battery 10 in FIG. 2 includes a positive electrode layer 14 having a positive-electrode active material 12, a solid electrolyte layer 16 composed of a lithium-ion conductive material, and a negative electrode layer 20 having a negative-electrode active material 18, and the solid electrolyte layer 16 is disposed between the positive electrode layer 14 and the negative electrode layer 20. The positive-electrode active material 12 is an oriented polycrystalline body composed of lithium transition metal oxide grains oriented in a given direction. Although the all-solid-state batteries disclosed in Patent Documents 1 and 2 have thick positive electrode layers, their capacity and energy density do not increase as expected as described above. Since the positive-electrode active materials used for the positive electrode layers in Patent Documents 1 and 2 are not oriented, highly-efficient intercalation and deintercalation of lithium ions probably cannot occur over the entire thickness of the thick positive electrode layers. For example, lithium present at the side, of the thick positive electrode layer, away from the solid electrolyte may be insufficiently deintercalated. The positive-electrode active material 12 is an oriented polycrystalline body composed of lithium transition metal oxide grains oriented in a given direction; thus, even if the positive-electrode active material is thick, intercalation or deintercalation of lithium ions efficiently occurs over the entire thickness of the positive electrode layer, and the capacity is maximized due to the thick positive-electrode active material. For example, lithium present at the side, of the thick positive electrode layer, away from the solid electrolyte is sufficiently deintercalated. This improvement in capacity significantly increases the energy density of the all-solid-state battery. In sum, the all-solid-state battery in accordance with the present invention exhibits a large capacity and a high energy density. Thus, a relatively thin or compact all-solid-state battery is provided that has large capacity, high energy density, and high-level safety.

For example, in a preferred embodiment of the present invention, the all-solid-state battery has an energy density of 700 Wh/L or higher, a thickness of 5 mm or less, and each of longitudinal and lateral dimensions of 100 mm or less. In another preferred embodiment of the present invention, the all-solid-state battery has an energy density of 600 Wh/L or higher, a thickness of 2 mm or less, and each of longitudinal and lateral dimensions of 50 mm or less. In still another preferred embodiment of the present invention, the all-solid-state battery has an energy density of 500 Wh/L or higher, a thickness of 1 mm or less, and each of longitudinal and lateral dimensions of 50 mm or less. In still another preferred embodiment of the present invention, the all-solid-state battery has an energy density of 250 Wh/L or higher, a thickness of 0.5 mm or less, and each of longitudinal and lateral dimensions of 50 mm or less. In still another preferred embodiment of the present invention, the all-solid-state battery has an energy density of 100 Wh/L or higher, a thickness of 0.3 mm or less, and each of longitudinal and lateral dimensions of 50 mm or less. Alternatively, in another preferred embodiment of the present invention, the all-solid-state battery has an energy density of 100 to 1,000 Wh/L, a thickness of 0.1 to 10 mm, and each of longitudinal and lateral dimensions of 5 to 100 mm, and more preferably an energy density of 250 to 700 Wh/L, a thickness of 0.3 to 5 mm, and each of longitudinal and lateral dimensions of 10 to 50 mm.

The relatively thin or compact all-solid-state battery 10 having large capacity and high energy density of the present invention can be advantageously used in various fields that have rejected or have not anticipated practical application of conventional all-solid-state batteries. This is because the all-solid-state battery in the present invention has various advantageous characteristics, such as high-level safety (due to the elimination of flammable electrolytic solutions), high weather resistance (operable at, for example, 80° C. or higher), and long service life (due to the elimination of electrolytic solutions, which deteriorate in hot environment) in addition to large capacity and high energy density (resulting in a reduction in thickness or height). An all-solid-state cell stack composed of such batteries as unit cells can provide a high-voltage battery. Examples of preferred application that can utilize such various advantageous characteristics include sensors, sensor networks, wireless sensors, wireless sensor networks (e.g., structure deterioration diagnosis and environmental control/sensing), ubiquitous networks, remote sensors, agricultural sensors, smart cards, next generation high-functional cards, battery-equipped smart cards, smart cards for money trading, smart ID cards, ID cards, IC cards, embedded card power supplies, credit cards, radio-frequency identification devices (RFIDs), RFID stickers, RFID tags, identification tags, active radio frequency (RF) tag systems for monitoring or punishment application, identification tags for storage item tracking or retail-goods anti-theft, computers, laptop computers, portable computers, pocket computers, workstations, supercomputers, computer peripheral hardware, servers, scanners, watches, solar watches, wearable devices (for example, high-function wristwatch-type wearable devices, low-function wristwatch-type wearable devices, eyeglass-type wearable devices), wearable computers, mobile phones, portable terminals, portable devices, personal digital assistance (PDA), beepers, pagers, Blackberry (registered trademark) type terminals, personal digital organizers, personal data auxiliary devices, radios, CD players, cassette players, media players, MP3 players, multimedia entertainment equipment, a variety of other entertainment equipment, remote controllers for TV and stereo systems, tracking systems, GPS systems, tire pressure monitoring systems, positioning devices of satellite-based global positioning system applications, motion detectors for security systems and so on, radiation monitors, energy harvesting systems, energy harvesting power supplies, medical applications, pacemakers, body-implantable medicinal pumps, hearing aids, implantable thin film batteries, backup batteries for watches, cars, laundry machines, washing machines, digital cameras, compasses, acceleration sensors, acceleration switches, flashlights, cordless drills and other electric machine tools, and 3G shields (for example, technology and applications to achieve machine-to-machine (M2M), 3G shield applications in the medical and nursing care field, the energy field, the environment and ecology field, the crime prevention and disaster prevention field, the tourism and entertainment field, the construction and upkeep field, local support, etc.). Accordingly, the device included in the battery-equipped device of the present invention can be used in the above-mentioned applications (e.g., display).

The all-solid-state battery of the present invention is disposed such that the planar shape conforms to the periphery of the device on a substrate and at least partially has a complementary outer edge shape that conforms to the entire or a part of the outer edge shape of the device. Consequently, it is possible to provide a battery-equipped device that can significantly increase the degree of freedom of design and can output necessary electric power in a minimum space. In particular, such an all-solid-state battery described above is not only relatively thin or compact but also is mainly made of a ceramic material that can be formed into a desired outer edge shape (in particular, an irregular shape including a polygonal shape or an arc) in a plane direction (i.e., the direction perpendicular to the thickness). This is because that the oriented polycrystalline body constituting the positive electrode layer and the solid electrolyte layer, which are the main components of the all-solid-state battery, are made of ceramic materials and, therefore, a desired outer edge shape can be easily formed by ceramic molding technology or ceramic processing technology. The all-solid-stage battery thus having a desired outer edge shape is disposed such that the planar shape conforms to the periphery of the device on a substrate having a limited space. Consequently, the degree of freedom of design (in particular, the degree of freedom of design for miniaturization or space saving) can be significantly increased even in a device required to be reduced in size and space, such as a wearable device, and necessary electric power can be output in a minimum space.

Examples of particularly preferred application of the battery-equipped device having the above-described advantages include smart cards, wearable devices, wearable computers, and combinations thereof. These applications have the following advantages due to the use of the all-solid-state battery according to the present invention:

Smart card: Since a thin battery to be buried in a card is necessary, a high-capacity thin battery is required. For example, in a travel card, signal strength and communication distance are increased to allow a passenger to pass ticket gates without accompanying any act (such as an act of holding a card). In a credit card, it is possible to provide one time only password service to improve the security.

Wearable device and wearable computer: It is dispensable to be small and lightweight, and a high-capacity battery is needed for high functionalization. In addition, since it is worn at all times, high safety is required.

(1) Positive-Electrode Active Material

The positive-electrode active material 12 is an oriented polycrystalline body composed of lithium transition metal oxide grains oriented in a given direction. The given direction is preferably the direction of lithium-ion conduction, and the positive-electrode active material 12 is typically a layer in which a specific crystal face of each grain is oriented in the direction from the positive electrode layer 14 toward the negative electrode layer 20.

The grains contained in the positive-electrode active material 12 are composed of lithium transition metal oxide. The lithium transition metal oxide preferably has a layered rock-salt structure or a spinel structure, more preferably a layered rock-salt structure. The layered rock-salt structure has such characteristics that the occlusion of lithium ions decreases the oxidation-reduction potential and the exclusion of lithium ions increases the oxidation-reduction potential, and a composition containing Ni in a large amount is particularly preferred. The layered rock-salt structure is a crystal structure including layers of transition metal other than lithium and lithium layers that are alternately stacked with oxygen-atom layers disposed therebetween, i.e., a crystal structure including layers of transition metal ions other than lithium and lithium-ion layers that are alternately stacked with oxide ions disposed therebetween (typically an $\alpha$-NaFeO$_2$-type structure of transition metal and lithium regularly arrayed in the [111] axis direction of a cubic rock-salt structure). Typical examples of lithium-transition metal complex oxide having a layered rock-salt structure include lithium nickelate, lithium manganate, lithium nickel manganate, lithium nickel cobaltate, lithium cobalt nickel manganate, and lithium cobalt manganate, and these materials may further contain one or more other elements, such as Mg, Al, Si, Ca, Ti, V, Cr, Fe, Cu, Zn, Ga, Ge, Sr, Y, Zr, Nb, Mo, Ag, Sn, Sb, Te, Ba, and Bi.

In specific, the lithium transition metal oxide preferably has a composition represented by $Li_xM1O_2$ or $Li_x(M1,M2)O_2$ where $0.5<x<1.10$, M1 is at least one transition metal element selected from the group consisting of Ni, Mn, and Co, and M2 is at least one element selected from the group consisting of Mg, Al, Si, Ca, Ti, V, Cr, Fe, Cu, Zn, Ga, Ge, Sr, Y, Zr, Nb, Mo, Ag, Sn, Sb, Te, Ba, and Bi; more preferably a composition represented by $Li_x(M1,M2)O_2$ where M1 is Ni and Co and M2 is at least one element selected from the group consisting of Mg, Al, and Zr; and most preferably a composition represented by $Li_x(M1,M2)O_2$ where M1 is Ni and Co and M2 is Al. Preferably, the atomic ratio of Ni to the total amount of M1 and M2 is 0.6 or more. Another more preferred composition is represented by $Li_xM1O_2$ where M1 is Ni, Mn, and Co, or M1 is Co. These compositions can have layered rock-salt structures. Ceramics having a $Li_x(Ni,Co,Al)O_2$-based composition, where M1 are Ni and Co and M2 is Al, are called NCA ceramics in some cases. A particularly preferred NCA ceramic is represented by the general formula: $Li_p(Ni_x,Co_y,Al_z)O_2$ (where $0.95\leq p\leq 1.3$, $0.6<x\leq 0.9$, $0.1<y\leq 0.3$, $0\leq z\leq 0.2$, and $x+y+z=1$) and has a layered rock-salt structure. Also preferred are lithium transition metal oxides having a composition represented by $Li_xM1O_2$ where M1 is Ni, Mn, and Co or M1 is Co.

As described above, the positive-electrode active material 12 is an oriented polycrystalline body composed of lithium transition metal oxide grains. Preferably, the lithium transition metal oxide grains have a platy shape with a thickness of approximately 2 to 100 μm. More preferably, the specific crystal face is the (003) plane oriented in the direction from the positive electrode layer 14 toward the negative electrode layer 20. This can discharge a large number of lithium ions at the time of high input (charge) and can receive a large number of lithium ions at the time of high output (discharge) without preventing intercalation or deintercalation of lithium ions into or from the positive-electrode active material 12. Planes other than the (003) plane, for example, the (101) and (104) planes may be oriented along the plate surface of the positive-electrode active material 12. The details of the grains and oriented polycrystalline body are described in Patent Document 3 (JP2012-009193A), Patent Document 4 (JP2012-009194A), and Patent Document 5 (JP4745463B), the contents of which are incorporated herein by reference.

As described above, the oriented polycrystalline body of the positive-electrode active material 12 can be readily thickened compared to non-oriented polycrystalline bodies. In order to increase the amount of the active material per unit area, the oriented polycrystalline body preferably has a thickness of at least 5 μm, more preferably at least 10 μm, and most preferably at least 25 μm. The upper limit of the thickness is not particularly limited but may be practically 500 μm, more practically 200 μm, and most practically 100 μm.

Preferably, the positive-electrode active material 12 has a sheet shape. A preferred method of preparing the sheet positive-electrode active material (hereinafter referred to as a positive-electrode active material sheet) will be described later. The positive-electrode active material 12 may be composed of a single positive-electrode active material sheet or a laminate of several sheets prepared by division of a positive-electrode active material sheet.

(2) Solid Electrolyte Layer

The lithium-ion conductive material of the solid electrolyte layer 16 is preferably a garnet-based ceramic material, a nitride-based ceramic material, a perovskite-based ceramic material, a phosphate-based ceramic material, a sulfide-based ceramic material, or a polymer-based material, and more preferably at least one selected from the group consisting of a garnet-based ceramic material, a nitride-based ceramic material, a perovskite-based ceramic material, and a phosphate-based ceramic material. Examples of the garnet-based ceramic material include a Li—La—Zr—O-based material (in specific, $Li_7La_3Zr_2O_{12}$), a Li—La—Ta—O-based material (in specific, $Li_7La_3Ta_2O_{12}$), and the garnet-based ceramic material may be the materials described in Patent Document 6 (JP2011-051800A), Patent Document 7 (JP2011-073962A), and Patent Document 8 (JP2011-073963A), the contents of which are incorporated herein by reference.

Examples of the nitride-based ceramic material include $Li_3N$. Examples of the perovskite-based ceramic material include Li—La—Zr—O-based materials (in specific, $LiLa_{1-x}Ti_xO_3$ ($0.04\leq x\leq 0.14$)). Examples of the phosphate-based ceramic material include lithium phosphate, nitrogen-doped lithium phosphate (LiPON), Li-Al-Ti—P—O, Li-Al-Ge—P—O, and Li-A-Ti—Si—P—O (in specific, $Li_{1+x+y}Al_xTi_{2-x}Si_yP_{3-y}O_{12}$ ($0\leq x\leq 0.4$ and $0<y\leq 0.6$)).

The particularly preferable lithium-ion conductive material is a garnet-based ceramic material, which does not react with lithium in the negative electrode even after direct contact. More preferred materials are sintered oxides having a garnet-type or pseudo-garnet-type crystal structure containing Li, La, Zr, and O because the structure has excellent sintering properties, is readily densified, and has high ion conductivity. The garnet-type or pseudo-garnet-type crystal structure having such a composition is called an LLZ crystal structure and has an XRD pattern similar to that in X-ray diffraction file No. 422259 ($Li_7La_3Zr_2O_{12}$) in Cambridge Structural Database (CSD). The structure may have constituent elements different from that in No. 422259 and may have a Li content in the ceramic different from that in No. 422259, and thus may have a diffraction angle and diffraction intensity profile different from that in No. 422259. Preferably, the molar ratio Li/La of Li to La is 2.0 or more and 2.5 or less, and the molar ratio Zr/La of Zr to La is 0.5 or more and 0.67 or less. The garnet-type or pseudo-garnet-type crystal structure may further contain Nb and/or Ta. That is, partial replacement of Zr in LLZ with Nb and/or Ta improves conductivity in comparison to before the replacement. Preferably, Zr is replaced with Nb and/or Ta such that the molar ratio (Nb+Ta)/La is 0.03 or more and 0.20 or less. It is preferred that the garnet-based sintered oxide further contain Al, and these elements may be present in the crystal lattice or at positions other than the crystal lattice. Preferably, Al is added in an amount of 0.01 to 1 mass % of the sintered oxide, and the molar ratio Al/La of Al to La is 0.008 to 0.12. Such an LLZ-based ceramic is prepared according to or by appropriately modifying a known process described in Patent Document 6 (JP2011-051800A), Patent Document 7 (JP2011-073962A), and Patent Document 8 (JP2011-073963A), the contents of which are incorporated herein by reference.

Another particularly preferable lithium-ion conductive material is a phosphate-based ceramic material, more preferably nitrogen-doped lithium phosphate (LiPON).

The solid electrolyte layer 16 may have any size; and its thickness is preferably 0.0005 to 0.5 mm, more preferably 0.001 to 0.2 mm, and most preferably 0.005 to 0.1 mm, in view of charge-discharge rate characteristics and mechanical strength.

The solid electrolyte layer 16 may be formed by a particle jet coating process, a solid phase process, a solution process, a gas phase process, or a direct bonding process. Examples of the particle jet coating process include aerosol deposition (AD), gas deposition (GD), powder jet deposition (PJD), cold spraying (CS), and flame coating. The aerosol deposition (AD) is particularly preferred because it can be carried out at room temperature, thus preventing a variation in a composition during the process and formation of a high-resistance layer due to reaction with a positive-electrode plate. Examples of the solid phase process include tape lamination processes and printing processes. Tape lamination processes are preferred because they can form a thin solid electrolyte layer 16 and facilitate the thickness control. Examples of the solution process include hydrothermal synthesis, sol-gel processes, precipitation processes, microemulsion processes, and solvent evaporation processes. Hydrothermal synthesis is particularly preferred among these processes because it can readily yield highly crystalline crystal grains at low temperature. Microcrystals synthesized by these processes may be deposited or directly precipitated on the positive electrode. Examples of the gas phase process include laser deposition (PLD), sputtering, evaporation-condensation (PVD), chemical vapor deposition (CVD), vacuum deposition, and molecular beam epitaxy (MBE). The laser deposition (PLD) is particularly preferred because it causes a small variation in a composition and readily yields a relatively high-crystalline film. Direct bonding chemically activates the surfaces of a preliminarily formed solid electrolyte layer 16 and positive-electrode active material 12 and bonds the surfaces to each other at low temperature. The interface may be activated with plasma or by chemical modification with functional groups, such as hydroxyl groups.

(3) Negative-Electrode Active Material

The negative-electrode active material 18 may be known negative-electrode active materials that can be used in all-solid-state lithium batteries. Preferred examples of the negative-electrode active material 18 include lithium metal, lithium alloy, carbonaceous materials, and lithium titanate (LTO). Preferably, the negative-electrode active material 18 is prepared by forming a thin film of lithium metal or an alloy of lithium metal and any other metal on a negative-electrode collector 24 (for example, copper foil) by vacuum deposition, sputtering, CVD, or the like.

(4) Collector

Preferably, the positive electrode layer 14 includes the positive-electrode active material 12 and a positive-electrode collector 22 disposed on a face, remote from the solid electrolyte layer 16, of the positive-electrode active material 12. Preferably, the negative electrode layer 20 includes the negative-electrode active material 18 and the negative-electrode collector 24 disposed on a face, remote from the solid electrolyte layer 16, of the negative-electrode active material 18. Examples of the materials of the positive-electrode collector 22 and negative-electrode collector 24 include platinum (Pt), platinum (Pt)/palladium (Pd), gold (Au), silver (Ag), aluminum (Al), copper (Cu), and an indium-tin oxide (ITO) film.

(5) Casing

Any casing 26 can be used that can accommodate a unit cell or a stack of multiple unit cells stacked in series or parallel. Since the all-solid-state battery 10 has no concern about leakage of an electrolytic solution, the casing 26 may have a relatively simple form. For example, the casing may be in the form of a chip to be mounted in an electronic circuit or a laminate cell in the application for thin, wide space (for example, a multi-layer aluminum (Al)/polypropylene (PP) composite sheet).

(6) Shape and Position of all-Solid-State Battery

The all-solid-state battery used in the present invention at least partially has a complementary outer edge shape that conforms to the entire or a part of the outer edge shape of the device and is disposed such that the planar shape conforms to the periphery of the device on a substrate. This can significantly increase the degree of freedom of design in a device required to be reduced in size and space, such as a wearable device. In addition, since the all-solid-state battery according to the present invention has a high capacity and a high energy density while being small or thin, necessary electric power can be output in a minimum space. In the disposition of an all-solid-state battery, the term "shape conforms to (the periphery of the device)" typically indicates that the device and the all-solid-state battery have similar outer edge shapes, and is a concept involving a relation such as a concave and a convex. In this meaning, such an outer edge shape can be expressed as "complementary outer edge shape". With the conformity of the shape, at least a part of the outer edge shape of a device conforms to at least a part of the outer edge shape of the all-solid-state battery. In this case, the conformable outer edge shape preferably includes a non-linear shape from the viewpoints of significantly increasing the degree of freedom of design and of capable of producing necessary capacity and energy by effectively using the space for disposing the all-solid-state battery. Accordingly, the complementary outer edge shape of the all-solid-state battery preferably includes a C, V, U, and/or arc notch shape. Such a shape can significantly increase the degree of freedom of design of the battery-equipped device. Herein, the device may be any device operable by electric power supplied from the all-solid-state battery via interconnections. One or more all-solid-state batteries may be disposed in the device.

The all-solid-state battery may have any shape in the in-plane direction (the direction orthogonal to the thickness) as long as the above-described complementary outer edge shape is at least partially included. For example, the shape may be a square or rectangle, another polygonal shape such as a triangle, an arc, or a shape including such a shape in a part of the outer edge shape. In particular, the all-solid-state battery preferably has a surface shape including a polygonal shape and/or an arc. Such a shape can significantly increase the degree of freedom of design of the battery-equipped device. The shape may be formed during or after producing a part or all of the all-solid-state battery by any method, for example, by processing with, for example, laser radiation or with a mold.

Figure 2A:
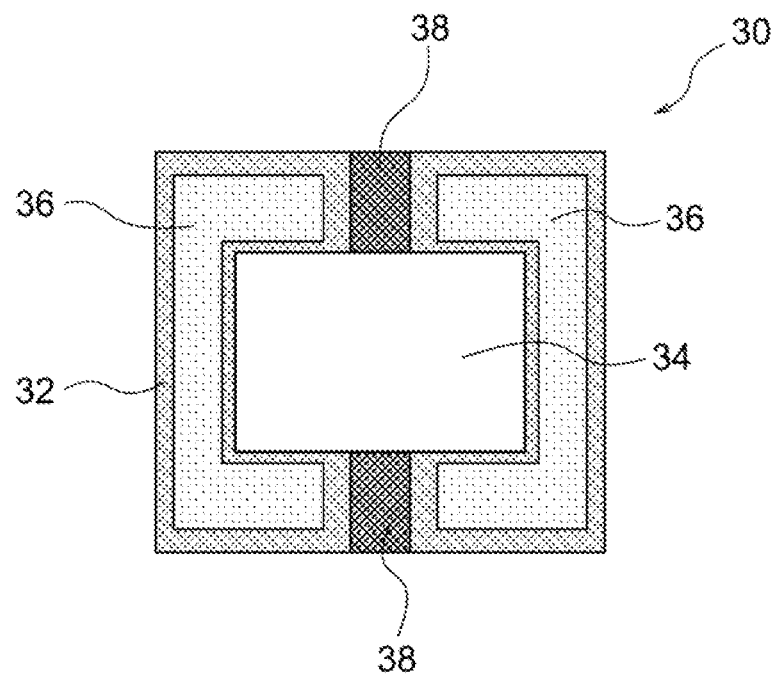
FIG. 2A is a top view illustrating an arrangement example of irregularly shaped all-solid-state batteries in a battery-equipped device of the present invention.
Figure 2B:
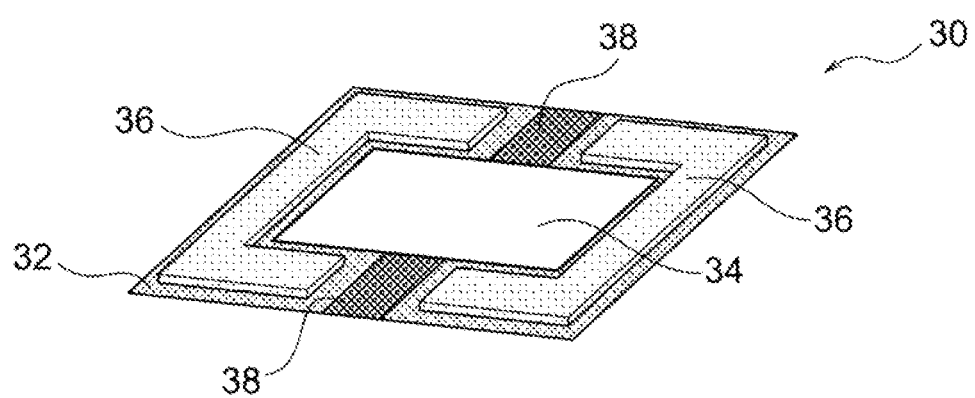
FIG. 2B is a perspective view of the arrangement example of the irregularly shaped all-solid-state batteries shown in FIG. 2A.

According to a preferred embodiment of the present invention, the battery-equipped device includes a plurality of all-solid-state batteries. This allows the device to be disposed at a desired position with the all-solid-state batteries disposed in the gap area with a high space efficiency. FIGS. 2A and 2B show an example of the battery-equipped device including a plurality of such all-solid-state batteries. In the battery-equipped device 30 shown in FIGS. 2A and 2B, in particular, the device 34 integrated in the battery-equipped device 30 can be a device such as a display, but may be any device requiring electric power to be used for a variety of applications as described above. In the battery-equipped device 30 shown in FIGS. 2A and 2B, a rectangular device 34, such as a display, is disposed at the center of a rectangular device substrate 32 including interconnections 38, and two all-solid-state batteries 36 each having a C notch shape are disposed so as to surround both sides of the device 34. On this occasion, the outer edge shape having two corners on both sides of the device 34 is conformed to a part of the outer edge shape (i.e., the C notch shape) of the all-solid-state battery 36, and the all-solid-state batteries 36 are disposed such that the shape conforms to the gap area in the periphery of the device 34 on the substrate 32. In this case, the all-solid-state batteries 36 have relatively large thicknesses. It should be noted that the all-solid-state batteries may have a lower thickness. In addition, the all-solid-state batteries may have any thickness depending on the relation with the thickness of the device, such as a display, as the target equipment and depending on the applicable target. The all-solid-state battery may have any outer edge shape, for example, a linear or curved shape, in the part where the shape does not conform to the shape of the device. The device substrate 32 may be flexible or rigid.

As described above, it is preferred to dispose the device 34 at the center of the substrate 32 and the all-solid-state batteries 36 in the gap area where the device 34 is not disposed on the substrate 32. It is also preferred to dispose the all-solid-state batteries 36 on both sides of the device 34 on the substrate 32. In both cases, the gap area restricted by device 34 can be used without waste by disposing a plurality of all-solid-state batteries. The all-solid-state batteries 36 preferably occupy an area of 50% or more, more preferably 60% or more, and most preferably 70% or more, of the gap area where the device is not disposed on the substrate 32. Other preferred embodiments are shown in FIGS. 3 to 6.

Figure 3:
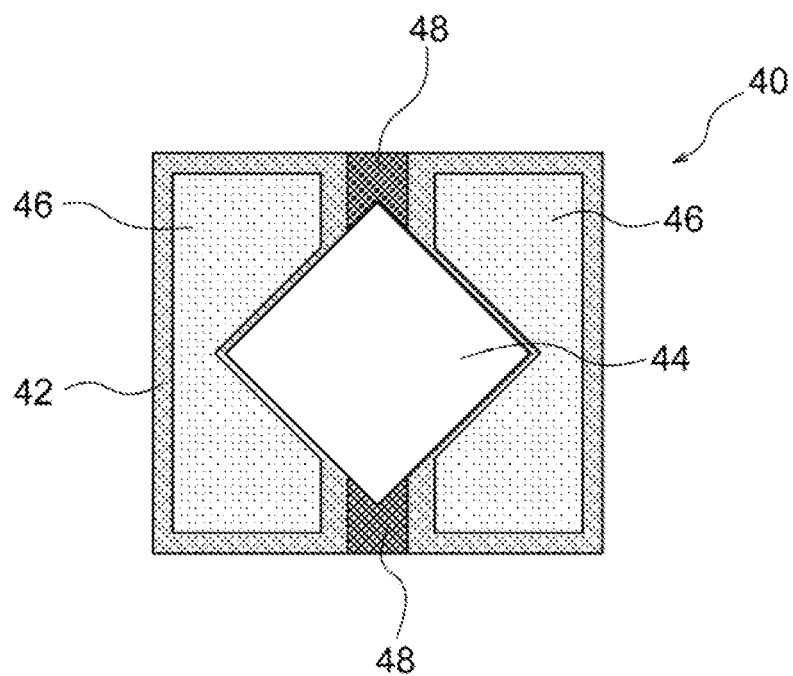
FIG. 3 is a diagram illustrating another arrangement example of irregularly shaped all-solid-state batteries in a battery-equipped device of the present invention.

In the battery-equipped device 40 shown in FIG. 3, a rectangular device 44, such as a display, is disposed at the center of a rectangular device substrate 42 having interconnections 48 in a direction rotated by 45 degrees (i.e., a direction such that the diagonal lines of the rectangular device 44 are parallel or perpendicular to the four sides of the outer edge of the substrate 42), and two all-solid-state batteries 46 each having a V notch shape are disposed so as to surround both sides of the device 44. On this occasion, the outer edge shape having one corner on each side of the device 44 is conformed to a part of the outer edge shape (i.e., the V notch shape) of the all-solid-state battery 46, and the all-solid-state batteries 46 are disposed such that the shape conforms to the gap area in the periphery of the device 44 on the substrate 42. Accordingly, two all-solid-state batteries 46 can be disposed in the almost entire of the gap area, other than the area for the rectangular device 44, on the substrate 42. Consequently, necessary electric power can be output from the minimum space due to restriction by the device 44 on the substrate 42, and the battery-equipped device 40 can be reduced in size.

Figure 4:
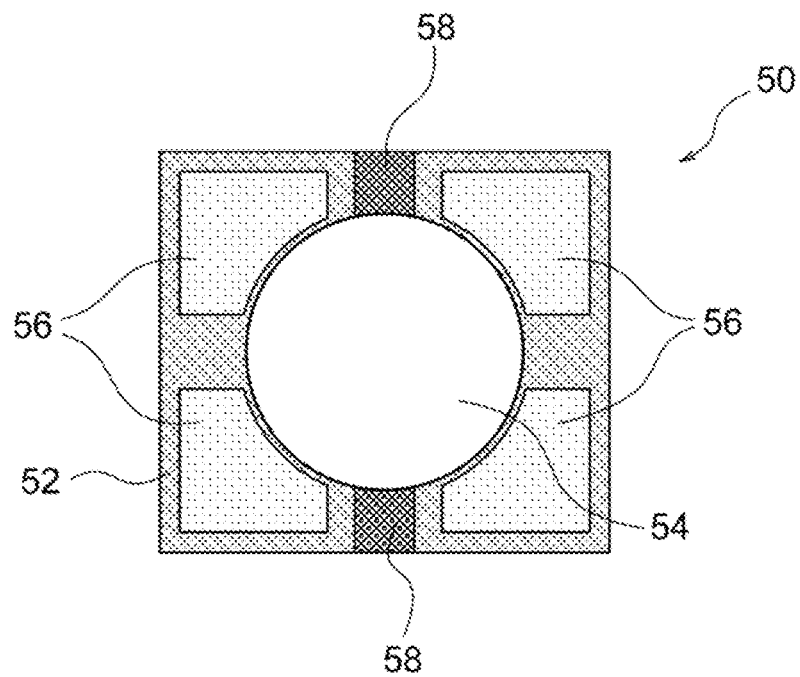
FIG. 4 is a diagram illustrating another arrangement example of irregularly shaped all-solid-state batteries in a battery-equipped device of the present invention.

In the battery-equipped device 50 shown in FIG. 4, a circular device 54, such as a display, is disposed at the center of a rectangular device substrate 52 having interconnections 58, and four all-solid-state batteries 56 each having an arc notch shape are disposed so as to surround four sides of the device 54. On this occasion, the arc outer edge shape of the device 54 is conformed to a part of the outer edge shape (i.e., the arc notch shape) of the all-solid-state battery 56, and the all-solid-state batteries 56 are disposed such that the shape conforms to the gap area in the periphery of the device 54 on the substrate 52. Accordingly, four all-solid-state batteries 56 can be disposed in the almost entire of the gap area, other than the area for the circular device 54, on the substrate 52. Consequently, necessary electric power can be output from the minimum space due to restriction by the device 54 on the substrate 52, and the battery-equipped device 50 can be reduced in size.

Figure 5:
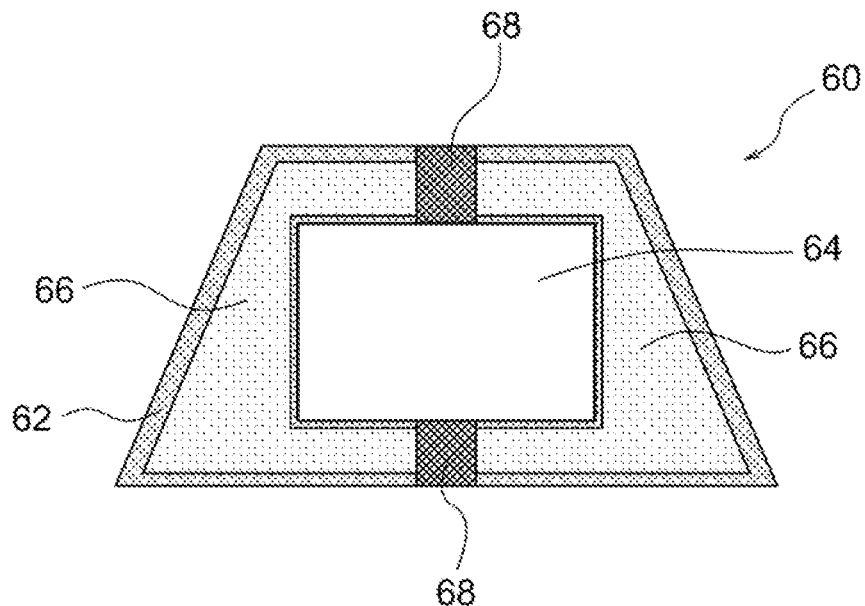
FIG. 5 is a diagram illustrating another arrangement example of irregularly shaped all-solid-state batteries in a battery-equipped device of the present invention.

In the battery-equipped device 60 shown in FIG. 5, a rectangular device 64, such as a display, is disposed at the center of a trapezoidal device substrate 62 having interconnections 68, and two all-solid-state batteries 66 each having a C notch shape are disposed so as to surround both sides of the device 64. On this occasion, the outer edge shape having two corners on both sides of the device 64 is conformed to a part of the outer edge shape (i.e., the C notch shape) of the all-solid-state battery 66, and the all-solid-state batteries 66 are disposed such that the shape conforms to the gap area in the periphery of the device 64 on the substrate 62. Accordingly, two all-solid-state batteries 66 can be disposed in the almost entire of the gap area, other than the area for the rectangular device 64, on the substrate 62. Consequently, necessary electric power can be output from the minimum space due to restriction by the device 64 on the substrate 62, and the battery-equipped device 60 can be reduced in size.

Figure 6:
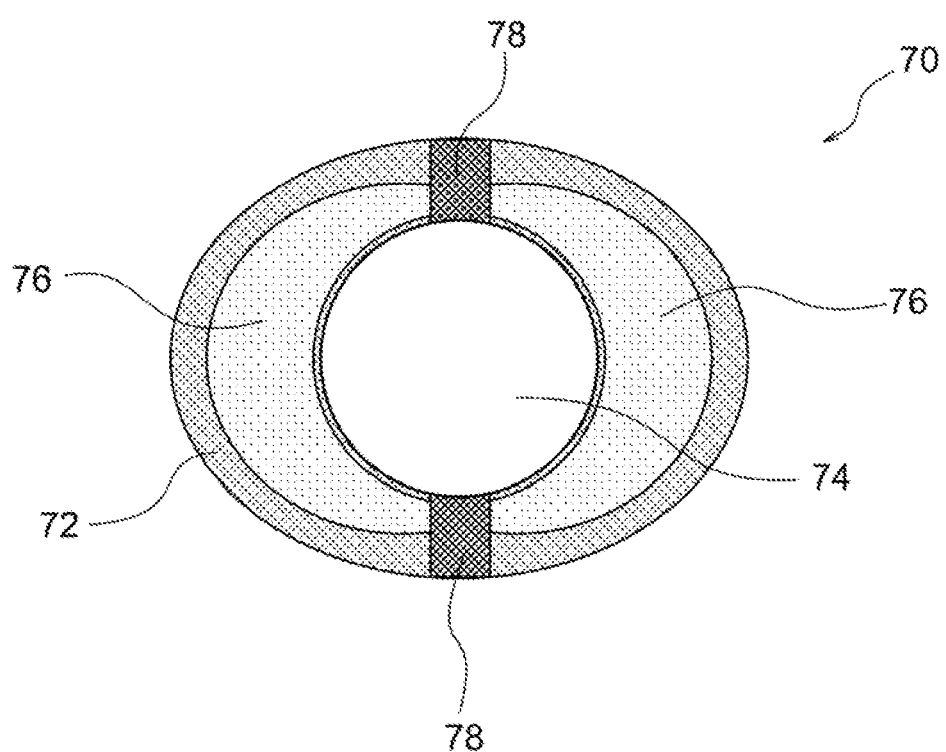
FIG. 6 is a diagram illustrating another arrangement example of irregularly shaped all-solid-state batteries in a battery-equipped device of the present invention.

In the battery-equipped device 70 shown in FIG. 6, a circular device 74, such as a display, is disposed at the center of an elliptical device substrate 72 having interconnections 78, and two all-solid-state batteries 76 each having an arc notch shape are disposed so as to surround both sides of the device 74. On this occasion, the arc outer edge shape of the device 74 is conformed to a part of the outer edge shape (i.e., the arc notch shape) of the all-solid-state battery 76, and the all-solid-state batteries 76 are disposed such that the shape conforms to the gap area in the periphery of the device 74 on the substrate 72. Accordingly, two all-solid-state batteries 76 can be disposed in the almost entire of the gap area, other than the area for the circular device 74, on the substrate 72. Consequently, necessary electric power can be output from the minimum space due to restriction by the device 74 on the substrate 72, and the battery-equipped device 70 can be reduced in size.

Although FIGS. 2A to 6 show examples of disposing a plurality of all-solid-state batteries on a single substrate, one all-solid-state battery may be disposed on one substrate as one unit, or a plurality of all-solid-state batteries may be disposed on one substrate as subunits and may be connected to each other with separately prepared interconnections or a conductive member, such as a conducting wire. Such substrates may be stacked on another substrate, and individual all-solid-state battery units may be connected to each other with separately prepared interconnections or a conductive member, such as a conducting wire, or with a wire on the another substrate. These allow the substrates on which all-solid-state batteries are disposed to be connected to each other with separately prepared interconnections or a conductive member, such as a conducting wire, and also to be formed into a freely bendable battery-equipped device. In this embodiment, the substrate is not limited to a flexible substrate, and a rigid substrate also can be used. The substrate may have approximately the same size as that of the all-solid-state battery to be disposed, may include one or more walls at the fringe area, or may include walls at the entire fringe area and an opening in the upper face. Illustratively, the substrate may have a box shape. If a substrate having an opening is used, the shape of the opening is preferably approximately the same as that of the all-solid-state battery, but is not limited thereto, and the all-solid-state battery disposed on the substrate may have any shape.

Although the substrate on which an all-solid-state battery is disposed may be any substrate that can provide a desired battery-equipped device, the substrate may be one that can provide a freely bendable battery-equipped device, as described above. In such a case, preferably, the all-solid-state battery (preferably a plurality of all-solid-state batteries) and a device are disposed on a bendable substrate (e.g., a flexible substrate), and the plurality of all-solid-state batteries and the device are connected via interconnections. This can form a bendable battery-equipped device and is particularly preferred in application, such as a smart card, a wearable device, or a wearable computer. When all-solid-state batteries are disposed on a bendable substrate, the total capacity of the batteries is divided into individual units (compact all-solid-state batteries), and the compact all-solid-state batteries are disposed on the substrate. This allows the disposed batteries to be formed into a freely bendable battery-equipped device, can significantly increase the degree of freedom of design for miniaturization or space saving, and also can decrease some external stress applied to the all-solid-state batteries to improve the reliability. The bendable substrate may have any flexibility as long as it can be bent and is not required to be capable of being folded. The substrate may be foldable within the range not impairing the battery-equipped device performance. Accordingly, the bendable substrate may be a flexible substrate, but a plurality of substrates each not having flexibility may be connected to form a bendable substrate as a whole. The bendable substrate may be any substrate having flexibility as a whole according to the application and may be composed of one material for the entire substrate or may have a layered structure composed of a laminate of different materials. It is further preferred to form interconnections on a bendable substrate, such as a flexible substrate. For example, a flexible printed circuit board is an example thereof, but the substrate is not limited thereto. That is, a bendable substrate, such as a flexible substrate, preferably has interconnections, and a flexible printed circuit board (FPC) is an example thereof. In this case, at least part of the interconnections can be incorporated in a flexible printed circuit board to achieve further miniaturization and space saving. The flexible printed circuit board typically includes an insulating resin layer and an interconnection layer.

The all-solid-state battery may be disposed on a substrate by any method. That is, the all-solid-state battery may be bonded to a substrate with an adhesive, connected to a substrate with a pin, or buried in a substrate.

Production of Positive-electrode Active Material Sheet

A preferred method of preparing the positive-electrode active material sheet will now be described.

(1) Preparation of Base Particles

The base particles are prepared by appropriately mixing particles of compounds containing, for example, Li, Co, Ni, and Mn, such that the positive-electrode active material has a composition $LiMO_2$ after synthesis and a layered rock-salt structure. Alternatively, the base particles may have a composition $LiMO_2$ (may be already synthesized).

Alternatively, as necessary, the base particles may be prepared by mixing particles of compounds, other than lithium compounds, containing, for example, Co, Ni, and Mn or may have a composition $(Co,Ni,Mn)O_x$. In this case, after the firing process of a green body, the fired body is further reacted with a lithium compound to yield $LiMO_2$.

To promote the grain growth and to compensate for the volatilized component during the firing process, a lithium compound may be added in an excess amount of 0.5 to 30 mol %. To promote the grain growth, low-melting oxide, such as bismuth oxide, or low-melting glass, such as borosilicate glass, may be added in an amount of 0.001 to 30 wt %.

(2) Base-Particle Shaping Process

The base particles are formed into a sheet self-supporting green body. Typically, the "self-supporting green body" maintains its shape as a sheet by itself. However, the "self-supporting green body" also includes a green body that cannot maintain its shape as a sheet by itself but is affixed or deposited on a substrate and then peeled from the substrate before or after firing.

The green body may be formed, for example, by a doctor blade process that uses slurry containing the base particles. Alternatively, the process of forming the green body may be performed with a drum dryer, with which base-material-containing slurry is applied onto a heated drum to be dried thereon, and the dried product is scraped off with a scraper. A disc dryer may be used, with which the slurry is applied onto a heated disk surface to be dried thereon, and the dried product is scraped off with a scraper in the process of forming the green body. Hollow granules produced under properly determined conditions of the spray dryer are regarded as a curved sheet green body and thus may be suitably used as a green body. The green body may be formed by an extrusion molding process that uses a slurry mixture containing the base particles.

In the doctor blade process, the green body of the platy polycrystalline particles before firing may be prepared by applying slurry onto a flexible plate (for example, an organic polymer plate, such as a PET film), drying and solidifying the applied slurry in the form of a green body, and peeling the green body from the plate. In the preparation of the slurry or slurry mixture before shaping, inorganic particles may be dispersed in an appropriate dispersion medium, and a binder or plasticizer may be added if needed. Preferably, the slurry is prepared so as to have a viscosity of 500 to 4000 cP and is defoamed under a reduced pressure.

(3) Firing Process of Green Body

In this firing process, the green body produced in the shaping process is placed on a setter and fired, for example, in the state as it is shaped (the sheet state). Alternatively, in the firing process, the sheet green body may be properly cut or pulverized and then fired in a sagger.

The mixed particles before synthesis, if used as the base particles, result in sintering and grain growth in addition to synthesis in this firing process. In the present invention, the green body has a sheet shape, which limits grain growth in the thickness direction. Thus, after the grain growth into one crystal grain in the thickness direction of the green body, the grain growth proceeds only in the in-plane direction of the green body. At this time, the specific energy-stable crystal face spreads over the sheet surface (plate surface). In this way, a thin sheet (self-supporting film) is produced in which the specific crystal face is oriented in parallel with the sheet surface (plate surface).

If the base particles are $LiMO_2$, the crystal faces favorable for the intercalation and deintercalation of lithium ions, i.e., the (101) and (104) planes, are oriented so as to be exposed to the sheet surface (plate surface). If the base particles do not contain lithium (for example, $M_3O_4$ having a spinel structure), the (h00) plane, which will be the (104) plane after the reaction with a lithium compound to yield $LiMO_2$, is oriented so as to be exposed to the sheet surface (plate surface).

The firing temperature is preferably in the range of 800 to 1350° C. A temperature lower than 800° C. causes insufficient grain growth and a low degree of orientation. A temperature higher than 1350° C. accelerates decomposition and volatilization. The firing time is preferably 1 to 50 hours. A time less than one hour causes a low degree of orientation. A time exceeding 50 hours consumes excess energy. The firing atmosphere is properly determined so as to prevent decomposition during the firing. If lithium volatilization proceeds, it is preferred to dispose, for example, lithium carbonate in the same sagger to keep a lithium atmosphere. If oxygen release and further reduction proceed during the firing, it is preferred to fire the green body in an atmosphere under a high oxygen partial pressure.

If the sheet oriented by the firing is produced from the base particles not containing lithium compounds, the sheet is allowed to react with a lithium compound (such as lithium nitrate and lithium carbonate) to produce a positive-electrode active material film in which the crystal faces favorable for the intercalation and deintercalation of lithium ions are oriented so as to be exposed to the plate surface. For example, lithium nitrate is sprinkled over the oriented sheet, such that the molar ratio Li/M of Li to M is 1 or more, and the sheet is heat-treated to incorporate lithium. The heat-treatment temperature is preferably in the range of 600 to 800° C. A temperature lower than 600° C. causes insufficient reaction. A temperature higher than 800° C. causes a low degree of orientation.

(a) Positive-Electrode Active Material Sheet Containing $LiCoO_2$ Grains

The positive-electrode active material sheet containing $LiCoO_2$ grains is prepared, for example, by the following process. A green sheet is formed that contains $Co_3O_4$ and $Bi_2O_3$. The green sheet is fired at a temperature in the range of 900 to 1300° C. for a predetermined time to form an independent thin sheet (self-supporting film) composed of a large number of platy $Co_3O_4$ grains (h00)-oriented in the direction of the plate surfaces of the grains. The term "(h00)-orientated" indicates that the (h00) plane is oriented in parallel with the plate surface. During the firing, bismuth is removed from the sheet by volatilization, and $Co_3O_4$ is converted into CoO by reduction. The "independent" sheet (self-supporting film) indicates a sheet that can be handled alone separately from a support after the firing. That is, the "independent" sheet does not include a sheet fixed to and integrated with (nor readily separable from) a support (such as a substrate) by the firing. In such a green sheet formed in a thin film (self-supporting film), the amount of materials present in the thickness direction is significantly smaller than that in the grain plate-surface direction, i.e., the in-plane direction (the direction orthogonal to the thickness). Thus, in the early stage, multiple grains are present in the thickness direction, and the grain growth occurs in a random direction. After the grain growth proceeds and the materials in the thickness direction are consumed, the grain growth is limited to the in-plane, i.e., two-dimensional direction. This ensures the promotion of the grain growth in the surface direction. Even in a relatively thick green sheet having a thickness of approximately 100 µm or more, the grain growth in the surface direction is ensured by promoting the grain growth as high as possible. At this time, the grain growth occurs selectively only in grains having the crystal face with the lowest surface energy in the plane of the green sheet, in a flat (platy) manner in the in-plane direction. Consequently, the sheet firing yields platy crystalline grains that have a high aspect ratio and the specific crystal face (the (h00) plane in this case) oriented in the grain plate-surface direction and that are composed of CoO. Then, CoO is oxidized to $Co_3O_4$ as the temperature decreases. At this time, the orientation of CoO is inherited, thus producing $Co_3O_4$ platy crystalline grains having the specific crystal face (the (h00) plane in this case) oriented in the grain plate-surface direction. The degree of orientation readily decreases during the oxidization from CoO to $Co_3O_4$. This is because a large difference in crystal structure and interatomic distance of Co—O between CoO and $Co_3O_4$ readily disturbs the crystal structure during the oxidization, i.e., the intercalation of oxygen atoms. Thus, it is preferred to appropriately select such conditions as to maintain the degree of orientation as high as possible. For example, it is preferred to reduce the cooling rate, to maintain the green sheet at a predetermined temperature, and to decrease the oxygen partial pressure. The green sheet is fired to produce a thin film (self-supporting film) in which a large number of flaky grains having the specific crystal face oriented in the grain plate-surface direction are bonded to each other at grain boundaries in the surface direction. That is, a thin film (self-supporting film) is formed that substantially has one crystalline grain in the thickness direction. It should be noted that "a thin film that substantially has one crystalline grain in the thickness direction" does not exclude a film that has portions (for example, ends) of crystalline grains adjacent to each other in the surface direction overlapping each other in the thickness direction. The self-supporting film can be a dense ceramic sheet containing a large number of flaky grains closely bonded to each other, as described above. The (h00)-oriented $Co_3O_4$ ceramic sheet produced in the above-described process is mixed with $Li_2CO_3$, and the mixture is then heated for a predetermined time, thereby introducing lithium into the $Co_3O_4$ grains. This provides a thin sheet for the positive-electrode active material 12 with the (003) plane oriented in the direction from the positive electrode layer 14 toward the negative electrode layer 20 and the (104) plane oriented along the plate surface.

(b) Positive-Electrode Active Material Sheet Containing $Li_p(Ni_x,Co_y,Al_z)O_2$ Grains The positive-electrode active material sheet containing $Li_p(Ni_x,Co_y,Al_z)O_2$ grains is prepared, for example, by the following process. A green sheet containing NiO powder, $Co_3O_4$ powder, and $Al_2O_3$ powder is formed and then fired at a temperature in the range of 1000 to 1400° C. in the atmosphere for a predetermined time to form an independent thin sheet (self-supporting film) composed of a large number of (h00)-oriented platy (Ni,Co,Al)O grains. An agent, such as $MnO_2$ and ZnO, can be added to promote the grain growth and thus to increase the degree of (h00)-orientation of the platy crystalline grains. The "independent" sheet indicates a sheet that can be handled alone separately from a support after the firing. That is, the "independent" sheet does not include a sheet fixed to and integrated with (nor readily separable from) a support (such as a substrate) by firing. In such a green sheet formed into a self-supporting film, the amount of materials present in the thickness direction is significantly smaller than that in the plate-surface direction, i.e., the in-plane direction (the direction orthogonal to the thickness). Thus, in the early stage, multiple grains are present in the thickness direction, and the grain growth occurs in a random direction. After the grain growth proceeds and the materials in the thickness direction are consumed, the grain growth is limited to the in-plane, i.e., two-dimensional direction. This ensures the promotion of the grain growth in the surface direction. Even in a relatively thick green sheet having a thickness of approximately 100 µm or more, the grain growth in the surface direction is ensured by promoting the grain growth as high as possible. That is, the surface-directional grain growth is promoted preferentially in grains having the low-surface-energy face parallel to the plate surface direction, i.e., the in-plane direction (the direction orthogonal to the thickness). The green sheet formed into a film is fired to produce a self-supporting film in which a large number of flaky grains having the specific crystal face oriented in parallel with the grain plate surfaces are bonded to each other at grain boundaries in the surface direction. That is, a self-supporting film is formed that substantially has one crystalline grain in the thickness direction. It should be noted that "a self-supporting film that substantially has one crystalline grain in the thickness direction" does not exclude a film that has portions (for example, ends) of crystalline grains adjacent to each other in the surface direction overlapping each other in the thickness direction. The self-supporting film can be a dense ceramic sheet containing a large number of flaky grains closely bonded to each other, as described above. The (h00)-oriented (Ni,Co,Al)O ceramic sheet produced in the above-described process is mixed with lithium nitrate ($LiNO_3$), and the mixture is then heated for a predetermined time, thereby introducing lithium into the (Ni,Co,Al)O grains. This provides a thin $Li(Ni_{0.75}Co_{0.2}Al_{0.05})O_2$ sheet for the positive-electrode active material 12 with the (003) plane oriented in the direction from the positive electrode layer 14 toward the negative electrode layer 20 and the (104) plane oriented along the plate surface.

Production of Lithium-Ion Conductive Material

A preferred method of preparing an Al-containing LLZ ceramic sintered body, which is a typical lithium-ion conductive material of the solid electrolyte layer 16, will now be described.

In the first firing process, a raw material containing a Li component, a La component, and a Zr component is fired to produce primary fired powder that contains Li, La, Zr, and O for synthesis of a ceramic. Then, in the second firing process, the primary fired powder produced in the first firing process is fired to produce a synthetic ceramic that contains Li, La, Zr, and O and has a garnet-type or pseudo-garnet-type crystal structure. This readily provides ceramic powder or sintered body that has an LLZ crystal structure, and contains aluminum that produces handleable sintering properties (density) and conductivity.

(Li Component, La Component, and Zr Component)

These components each may be appropriately selected from metal oxides, metal hydroxides, metal carbonates, and other metal salts that contain the metal components described above. For example, the Li component may be $Li_2CO_3$ or LiOH, the La component may be $La(OH)_3$ or $La_2O_3$, and the Zr component may be $ZrO_2$. Oxygen is typically contained as an element constituting compounds containing these metal constituents. A raw material to produce the ceramic material can contain a Li component, a La component, and a Zr component to such an extent as to yield the LLZ crystal structure from the Li, La, and Zr components by, for example, a solid phase reaction. The Li, La, and Zr components in LLZ can have a stoichiometric ratio of 7:3:2 or similar to that. In consideration of loss of the Li component, the Li component may be contained in an approximately 10% excess amount to the stoichiometric ratio of Li in LLZ, and the La and Zr components each may be contained in an amount equivalent to the molar ratio of the component in LLZ. For example, these components may be contained in a molar ratio, Li:La:Zr, of 7.7:3:2. The molar ratio of a specific compound is approximately 3.85:3:2 for $Li_2CO_3:La(OH)_3:ZrO_2$, approximately 3.85:1.5:2 for $Li_2CO_3:La_2O_3:ZrO_2$, approximately 7.7:3:2 for $LiOH:La(OH)_3:ZrO_2$, or approximately 7.7:1.5:2 for $LiOH:La_2O_3:ZrO_2$. The raw material powder may be prepared by an appropriate known raw powder preparation process for synthesis of ceramic powder. For example, the raw materials may be homogeneously mixed with an automated mortar machine or an appropriate ball mill.

(First Firing Process)

In the first firing process, at least the Li and La components are pyrolyzed to produce primary fired powder for facilitating the formation of an LLZ crystal structure in the second firing process. The primary fired powder may preliminarily have an LLZ crystal structure. The firing temperature is preferably 850° C. or higher and 1150° C. or lower. The first firing process may include one or more low temperature heating steps and one or more high-temperature heating steps within the temperature range. These heating steps help to produce uniform ceramic powder and a high-quality sintered body in the second firing process. After each of these multiple heating steps, if performed in the first firing process, the fired product is preferably kneaded and ground with, for example, an automated mortar machine, a ball mill, or a vibration mill. Dry grinding is desirable. These steps help to yield a more uniform LLZ phase in the second firing process. The heating steps of the first firing process are preferably performed at 850° C. or higher and 950° C. or lower and at 1075° C. or higher and 1150° C. or lower. More preferably, the steps are performed at 875° C. or higher and 925° C. or lower (most preferably at approximately 900° C.) and at 1100° C. or higher and 1150° C. or lower (most preferably at approximately 1125° C.). In the first firing process, the total heating time at the maximum temperature determined as a heating temperature is preferably approximately 10 hours or more and 15 hours or less. If the first firing process includes two heating steps, the heating time at the maximum temperature is preferably in the range of approximately 5 to 6 hours in each step. A change of one or more components in the starting material can reduce the time required for the first firing process. For example, if LiOH is used as one component contained in the starting material, the time to heat the LLZ constituents containing Li, La, and Zr at the maximum temperature can be 10 hours or less in a heating step at 850° C. or higher and 950° C. or lower to yield an LLZ crystal structure. This is because LiOH used in the starting material forms a liquid phase at a low temperature and thus readily reacts with other components at a lower temperature.

(Second Firing Process)

In the second firing process, the primary fired powder produced in the first firing process is heated at 950° C. or higher and 1250° C. or lower. In the second firing process, the primary fired powder produced in the first firing process is fired to produce a final ceramic product that is a complex oxide having an LLZ crystal structure. To yield such an LLZ crystal structure, for example, the LLZ constituents containing Li, La, and Zr are heated at 1125° C. or higher and 1250° C. or lower. If $Li_2CO_3$ is used as a Li component, heating is preferably performed at 1125° C. or higher and 1250° C. or lower. A temperature lower than 1125° C. may prevent the formation of a single LLZ phase and causes low Li conductivity, and a temperature higher than 1250° C. may cause formation of a heterogeneous phase (such as $La_2Zr_2O_7$) and causes low Li conductivity and significant crystal growth which fail to maintain the strength as a solid electrolyte. More preferably, the heating temperature is in the range of approximately 1180 to 1230° C. A change of one or more components in the starting material allows the second firing process to be performed at a lower temperature. For example, if LiOH is used as a Li component in the starting material, the LLZ constituents containing Li, La, and Zr may be heated at 950° C. or higher and lower than 1125° C. to yield an LLZ crystal structure. This is because LiOH used in the starting material forms a liquid phase at a low temperature and thus readily reacts with other components at a lower temperature. In the second firing process, the heating time at the heating temperature is preferably 18 hours or more and 50 hours or less. A time less than 18 hours causes insufficient formation of the LLZ-based ceramic, and a time exceeding 50 hours may cause the material to readily react with the setter through embedding powder and causes significant crystal growth, thus failing to achieve strength required for the sample. More preferably, the heating time is at least 30 hours. The second firing process is preferably performed after the primary fired powder is pressed by a known pressing process into a green body having a desired three-dimensional shape (for example, such a shape and size as to be used as the solid electrolyte of the all-solid-state battery). The green body of the primary fired powder promotes a solid phase reaction and provides a sintered body. After the second firing process, the ceramic powder produced in the second firing process may be formed into a green body and then additionally fired at a temperature similar to the heating temperature in the second firing process. If the green body of the primary fired powder is fired to be sintered in the second firing process, the second firing process is preferably performed with the green body buried into the same powder. This reduces loss of Li and a variation in the composition between before and after the second firing process. The green body of the raw powder is typically placed on the raw powder and then buried into the raw powder. This reduces reaction with the setter. If necessary, the green body may be held with the setter through the embedding powder placed on both sides of the green body to prevent warpage of the sintered body during the firing. If the second firing process is performed at a lower temperature with LiOH used as a Li component, the green body of the primary fired powder can be sintered without being buried into the powder. This is because a lower temperature in the second firing process relatively reduces the loss of Li and reaction with the setter.

The above firing processes produce a solid electrolyte layer 16 having an LLZ crystal structure. The first firing process and/or second firing process may be performed in the presence of an aluminum (Al)-containing compound to produce a solid electrolyte layer that has a crystal structure and contains aluminum.

EXAMPLES

The all-solid-state battery in a battery-equipped device of the present invention will now be described in further detail by the following examples. The all-solid-state batteries shown below do not have irregular shapes, but an all-solid-state battery having an irregular shape suitable for the present invention can be produced by forming each layer, such as a positive electrode layer, in an irregular shape in the examples shown below.

Example 1

An all-solid-state battery 10 having the configuration in FIG. 1 was produced. A positive-electrode active material sheet was produced as a positive-electrode active material 12 that had a layered rock-salt structure, a composition $Li(Ni_{1/3}Co_{1/3}Mn_{1/3})O_2$ (hereinafter referred to as NCM), and the (003) plane oriented in the direction from a positive electrode layer 14 toward a negative electrode layer 20. A positive-electrode active material sheet having a thickness of 30 µm was prepared. A solid electrolyte layer 16 was formed on the sheet positive-electrode active material 12. A ceramic material having a garnet-type crystal structure having a composition $Li_7La_3Zr_2O_{12}$ containing Al (hereinafter referred to as LLZ-Al) was used as a lithium-ion conductive material of the solid electrolyte layer 16. The solid electrolyte layer 16 was prepared to have a thickness of 10 µm. A negative-electrode active material 18 having a thickness of 10 µm was prepared with lithium metal. A positive-electrode collector 22 was prepared with aluminum foil having a thickness of 10 µm, and a negative-electrode collector 24 was prepared with copper foil having a thickness of 10 µm. A laminate of these components was produced as a unit cell. The unit cell was packaged by lamination with a multi-layer aluminum (Al)/polypropylene (PP) composite sheet. The resultant all-solid-state battery had longitudinal and lateral dimensions of 20 mm and 30 mm, respectively, when viewed from above and a thickness of 0.24 mm.

The produced battery was tested at a charge and discharge mode before the calculation of volumetric-energy density. In the test, the battery was charged at a constant current of 1 mA, then charged at a constant voltage of 4.1 V, and thereafter discharged at a constant current of 1 mA until the voltage reached 3 V. The observed discharge capacity (mAh) was 20 mAh. Under assumption of an average discharge voltage of 3.9 V, the volumetric-energy density determined from the following formula (1) was 542 Wh/L:

$$(E \times C)/V \quad (1)$$

where E is a voltage (=3.9 V), C is a capacity (mAh), and V is a battery volume ($cm^3$).

Example 2

The unit cells produced in Example 1 were stacked in parallel to produce a battery having a capacity of 100 mAh. The energy density calculated as in Example 1 was 650 Wh/L.

Example 3

The unit cells produced in Example 1 were stacked in parallel to produce a battery having a capacity of 300 mAh. The energy density calculated as in Example 1 was 750 Wh/L.

Example 4

The unit cell was produced in which the lithium-ion conductive material of a solid electrolyte layer 16 having a thickness of 5 µm was LiPON and the configuration other than that was the same as that in Example 1. The unit cell was packaged by lamination as in Example 1. The resultant all-solid-state battery had longitudinal and lateral dimensions of 20 mm and 30 mm, respectively, when viewed from above and a thickness of 0.24 mm. The resultant all-solid-state battery had a capacity of 20 mAh and a volumetric-energy density of 542 Wh/L by the same calculation as in Example 1.

Example 5

The unit cells produced in Example 4 were stacked in parallel to produce a battery having a capacity of 100 mAh. The energy density calculated as in Example 4 was 650 Wh/L.

Example 6

The unit cells produced in Example 4 were stacked in parallel to produce a battery having a capacity of 300 mAh. The energy density calculated as in Example 1 was 750 Wh/L.

Results

The dimensions and performance of the batteries produced in Examples 1 to 6 are summarized in Table 1.

TABLE 1

|  | Dimensions of battery (mm) | Capacity (mAh) | Voltage (V) | Energy density (Wh/L) |
| --- | --- | --- | --- | --- |
| Example 1 | 20 × 30 × 0.24 | 20 | 3.9 | 542 |
| Example 2 | 20 × 30 × 1.0 | 100 | 3.9 | 650 |
| Example 3 | 20 × 30 × 2.6 | 300 | 3.9 | 750 |
| Example 4 | 20 × 30 × 0.24 | 20 | 3.9 | 542 |
| Example 5 | 20 × 30 × 1.0 | 100 | 3.9 | 650 |
| Example 6 | 20 × 30 × 2.6 | 300 | 3.9 | 750 |

The dimensions and performance of the batteries in Table 1 are very suitable for various applications that are supposed in the present invention. For reference, the dimensions and performance of the batteries determined, in private view of the applicant, to be desired in several applications are summarized in Table 2. It should be understood that the all-solid-state battery in accordance with the present invention is very favorable for the above-mentioned various applications including the applications in Table 2. A parallel stack of unit cells achieves high capacity in an application requiring a significantly high capacity, such as an electric vehicle in Table 2.

TABLE 2

| Application | Dimensions of battery (mm) | Capacity (mAh) | Voltage (V) | Energy density (Wh/L) |
| --- | --- | --- | --- | --- |
| Backup power source for volatile memory | 20 × 30 × 3 | 300 | 3.9 | over 600 |
| Smart card | 20 × 50 × 0.2 | 3 | 3.9 | 60 |
| Agricultural sensor (for measuring temperature/humidity) | 20 × 30 × 4 | 6-12 | 3.9 | 10-20 |
| Diagnosis of structure | 20 × 30 × 4 | 12-60 | 3.9 | 20-100 |
| Radiation monitor | 20 × 30 × 4 | 240 | 3.9 | 400 |
| Smartphone | 30 × 80 × 4 | 2000 | 3.9 | 600 |
| Electric vehicle | 100 × 200 × 40 | 50000 | 3.9 | over 600 |

What is claimed is:

1. A battery-equipped device comprising:
a substrate;
a device disposed on the substrate;
an all-solid-state battery disposed such that the planar shape conforms to the periphery of the device on the substrate and at least partially having a complementary outer edge shape that conforms to the entire or a part of the outer edge shape of the device; and
interconnections connecting the device and the all-solid-state battery, wherein the all-solid-state battery comprises: a positive electrode layer comprising a positive-electrode active material that is an oriented polycrystalline body composed of lithium transition metal oxide grains oriented in a given direction; a solid electrolyte layer composed of a lithium-ion conductive material; and a negative electrode layer comprising a negative-electrode active material,
wherein the all-solid-state battery has a surface shape including a polygonal shape and/or an arc, other than a square and a rectangle, and
wherein the interconnections bisect the battery-equipped device along a major surface of the battery equipped device.

2. The battery-equipped device according to claim 1, wherein the device is used in at least one application selected from the group consisting of smart cards, wearable devices, and wearable computers.

3. The battery-equipped device according to claim 1, wherein the complementary outer edge shape of the all-solid-state battery includes a C, V, U, and/or arc notch shape.

4. The battery-equipped device according to claim 1, wherein the battery-equipped device includes a plurality of the all-solid-state batteries.

5. The battery-equipped device according to claim 4, wherein the device is disposed at the center of the substrate, and the all-solid-state batteries are disposed in a gap area where the device is not disposed on the substrate.

6. The battery-equipped device according to claim 4, wherein the all-solid-state batteries are disposed on both sides of the device on the substrate.

7. The battery-equipped device according to claim 4, wherein the all-solid-state batteries occupy an area of 50% or more of the gap area where the device is not disposed on the substrate.

8. The battery-equipped device according to claim 1, wherein the all-solid-state battery has:
an energy density of 700 Wh/L or higher, a thickness of 5 mm or less, and each of longitudinal and lateral dimensions of 100 mm or less; or
an energy density of 600 Wh/L or higher, a thickness of 2 mm or less, and each of longitudinal and lateral dimensions of 50 mm or less; or
an energy density of 500 Wh/L or higher, a thickness of 1 mm or less, and each of longitudinal and lateral dimensions of 50 mm or less; or
an energy density of 250 Wh/L or higher, a thickness of 0.5 mm or less, and each of longitudinal and lateral dimensions of 50 mm or less; or
an energy density of 100 Wh/L or higher, a thickness of 0.3 mm or less, and each of longitudinal and lateral dimensions of 50 mm or less; or
an energy density of 100 to 1,000 Wh/L, a thickness of 0.1 to 10 mm, and each of longitudinal and lateral dimensions of 5 to 100 mm; or
an energy density of 250 to 700 Wh/L, a thickness of 0.3 to 5 mm, and each of longitudinal and lateral dimensions of 10 to 50 mm.

9. The battery-equipped device according to claim 1, wherein the oriented polycrystalline body of the positive-electrode active material has a thickness of at least 5 μm.

10. The battery-equipped device according to claim 1, wherein the oriented polycrystalline body of the positive-electrode active material has a thickness of at least 10 μm.

11. The battery-equipped device according to claim 1, wherein the oriented polycrystalline body of the positive-electrode active material has a thickness of at least 25 μm.

12. The battery-equipped device according to claim 1, wherein the grains contained in the positive-electrode active material have a layered rock-salt structure or a spinel structure.

13. The battery-equipped device according to claim 1, wherein the grains contained in the positive-electrode active material have a composition represented by $Li_xM1O_2$ or $Li_x(M1,M2)O_2$ where $0.5<x<1.10$, M1 is at least one transition metal element selected from the group consisting of Ni, Mn, and Co, and M2 is at least one element selected from the group consisting of Mg, Al, Si, Ca, Ti, V, Cr, Fe, Cu, Zn, Ga, Ge, Sr, Y, Zr, Nb, Mo, Ag, Sn, Sb, Te, Ba, and Bi.

14. The battery-equipped device according to claim 13, wherein the composition is represented by $Li_x(M1,M2)O_2$ where M1 is Ni and Co, and M2 is at least one element selected from the group consisting of Mg, Al, and Zr; or wherein the composition is represented by $Li_xM1O_2$ where M1 is Ni, Mn, and Co, or M1 is Co.

15. The battery-equipped device according to claim 1, wherein the grains contained in the positive-electrode active material have a composition represented by $Li_p(Ni_x,Co_y,Al_z)O_2$ where $0.9 \leq p \leq 1.3$, $0.6 < x < 0.9$, $0.1 < y \leq 0.3$, $0 \leq z \leq 0.2$, and $x+y+z=1$ and have a layered rock-salt structure.

16. The battery-equipped device according to claim 1, wherein the lithium-ion conductive material of the solid electrolyte layer is a garnet-based ceramic material, a nitride-based ceramic material, a perovskite-based ceramic material, a phosphate-based ceramic material, a sulfide-based ceramic material, or a polymer-based material.

17. The battery-equipped device according to claim 1, wherein the positive electrode layer comprises the positive-electrode active material and a positive-electrode collector disposed on a face, remote from the solid electrolyte layer, of the positive-electrode active material, and the negative electrode layer comprises the negative-electrode active material and a negative-electrode collector disposed on a face, remote from the solid electrolyte layer, of the negative-electrode active material.

* * * * *